United States Patent [19]

Slagle

[11] 4,311,118
[45] Jan. 19, 1982

[54] WATER INJECTION SYSTEM FOR DIESEL ENGINE

[76] Inventor: Bernie L. Slagle, R.D. #6, Rte. 206, Vincentown, N.J. 08088

[21] Appl. No.: 56,185

[22] Filed: Jul. 10, 1979
(Under 37 CFR 1.47)

Related U.S. Application Data

[63] Continuation-in-part of Ser. No. 779,723, Mar. 21, 1977, Pat. No. 4,240,380.

[51] Int. Cl.³ .............................................. F02D 19/00
[52] U.S. Cl. ................................ 123/25 A; 123/25 J; 123/25 M
[58] Field of Search ................. 123/25 G, 25 J, 25 K, 123/25 L, 25 M, 25 N, 198 A; 261/18 A

[56] References Cited
U.S. PATENT DOCUMENTS

| | | | |
|---|---|---|---|
| 1,212,745 | 1/1917 | Crockett | 123/25 J |
| 2,554,612 | 5/1951 | Bills et al. | 123/25 J |
| 2,889,819 | 6/1959 | Lockheed | 123/25 N |
| 3,631,843 | 1/1972 | Yeiser | 123/25 M |
| 3,845,745 | 11/1974 | Dunlap et al. | 123/25 J |
| 3,911,871 | 10/1975 | Williams et al. | 123/25 K |
| 3,921,599 | 11/1975 | Grow | 123/25 M |
| 4,096,829 | 6/1978 | Spears | 123/25 J |

*Primary Examiner*—Ira S. Lazarus
*Attorney, Agent, or Firm*—Duffield & Lehrer

[57] ABSTRACT

An electric pump delivers water from an reservoir to a nozzle located in the air intake manifold of a diesel engine. The pumping capacity of the pump is adjustable by varying the resistance of a variable resistor in series with the pump so that the system can be used with various engines requiring different amounts of water. Several safety switches are provided to prevent water from being pumped unless the engine is running at a predetermined speed, a predetermined oil pressure is reached and the throttle is depressed. An indicator light indicates when the water reservoir is empty and needs refilling.

7 Claims, 1 Drawing Figure

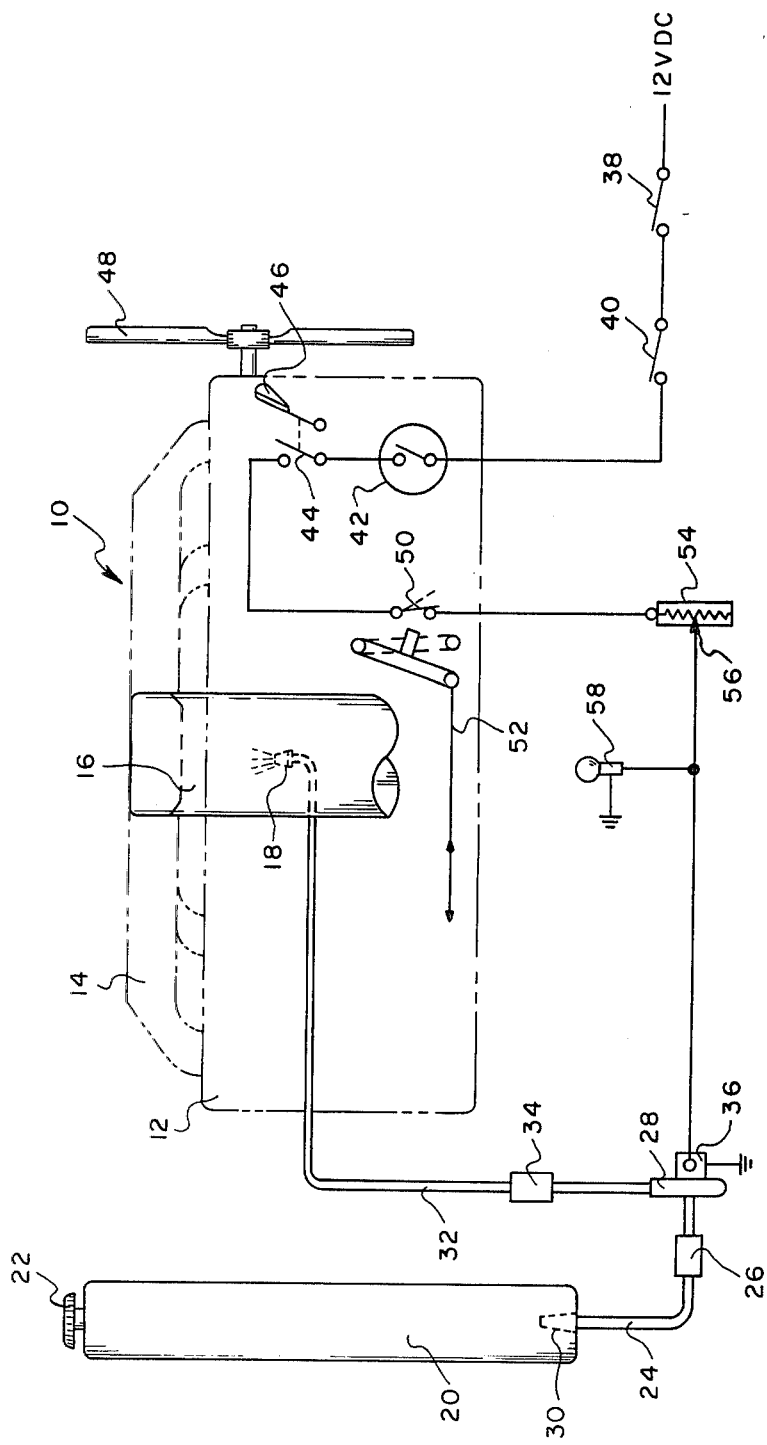

WATER INJECTION SYSTEM FOR DIESEL ENGINE

CROSS REFERENCE TO RELATED APPLICATION

This application is a continuation in part of co-pending application Ser. No. 779,723 filed Mar. 21, 1977, now U.S. Pat. No. 4,240,380.

BACKGROUND OF THE INVENTION

This invention is directed toward a water injection system for internal combustion engines and more particularly toward a system which is adapted to be used with a diesel engine. The advantages of adding water to the air-fuel mixture of an internal combustion engine are well known and described in the prior art such as U.S. Pat. No. 3,845,745. These advantages are also recognized in diesel engines such as described in, for example, U.S. Pat. Nos. 2,777,430, 2,922,408 and 4,062,338.

While numerous systems for providing water to an internal combustion engine have been proposed, these are normally quite complex requiring substantial interconnections to the engine and associated electrical system. This is particularly true of the water injection systems for diesel engines known to Applicant. Even further, Applicant is aware of no water injection system which may be manually adjusted so as to make the same adaptable to various size diesel engines. All systems known to Applicant are specifically adapted for a particular engine size and water requirement.

SUMMARY OF THE INVENTION

The foregoing described and other deficiencies of the prior art are overcome by the present invention which provides a water injection system for a diesel engine including an electric pump which delivers water from a reservoir to a nozzle located in the air intake manifold of the diesel engine. The pumping capacity of the pump is adjustable by varying the resistance of a variable resistor in series with the pump so that the system can be used with various engines requiring different amounts of water. Several safety switches are provided to prevent water from being pumped unless the engine is running at a predetermined speed, a predetermined oil pressure is reached and the throttle is depressed. An indicator light indicates when the water reservoir is empty and needs refilling.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

The FIGURE is a schematic representation of a water injection system for a diesel engine in accordance with the principles of the present invention.

DETAILED DESCRIPTION OF THE PREFERRED EMBODIMENT

Referring now to the drawing in detail there is shown in the sole FIGURE of the application a schematic representation of a water injection system for a diesel engine constructed in accordance with the principles of the present invention and designated generally as 10.

The water injection system 10 is shown in association with a diesel engine 12. The construction and operation of a diesel engine is well known in the art and accordingly a detailed description thereof is not believed to be necessary. The diesel engine 12 includes an air manifold 14 which leads to the combustion chambers. Air inlet pipe 16 feeds outside air into the manifold 14. Located within the air inlet pipe 16 is a water nozzle 18 which, as described more fully hereinafter, sprays water from the water injection system of the present invention into the air inlet pipe 16 and hence into the air manifold 14.

Water for the system is supplied from a holding tank or reservoir 20 which may be mounted under the hood in the vehicle engine compartment or in any other convenient location where mounting space is available. When needed, water may be added to the reservoir 20 by removing the fill cap 22 located at the top thereof.

A discharge line 24 connected to the bottom of reservoir 20 leads, through filter 26, to the input side of liquid pump 28. If desired, another filter or screen or the like 30 may be located within reservoir 20 to prevent foreign matter from entering discharge line 24. The output or pressure side of pump 28 is connected by way of pressure line 32, through filter 34, to the nozzle 18 where water is injected into the air flow entering the manifold 14.

Pump 28 is preferably of the rotary type and is driven by an electric motor 36. Motor 36 is connected to the vehicle's electrical system through the following circuit which controls operation of the motor 36 and hence the pump 28.

Switch 38, the first switch in the electrical circuit, is part of the vehicle key switch. Thus, switch 38 closes only when the vehicle key is in the on position. In series therewith is a manual selector switch 40 which may be turned on or off depending on whether the water injection system 10 is desired to be placed into the system or out. Also in series therewith is a normally open oil pressure switch 42. This switch closes only when the proper operating oil pressure has been sensed.

Connected to the oil pressure switch 42 is a normally open micro switch 44. Micro switch 44 is mechanically connected to an air vane 46 so as to be movable therewith. The air vane 46 lies directly behind fan 48 of the motor 12 and is responsive to the air pressure generated by the fan. Preferably vane 46 is so arranged that it closes normally open micro switch 44 when the fan 48 and therefore the engine speed is approximately 1500 rotations per minute. Thus, vane 46 and micro switch 44 function as a safety device to ensure that the water injection system will not be operative unless the engine is on and rotating at at least approximately 1500 revolutions per minute.

An additional safety micro switch 50 is further arranged in series with switches 42 and 44. Micro switch 50 is a normally close switch but is held in its open position by the throttle linkage 52. When the throttle is depressed, switch 50 is allowed to return to its closed position thereby completing the electrical circuit. Thus, it should be readily apparent that water will not be injected into the air intake pipe 16 unless the key switch 38 is closed, the manual switch 40 is turned on, proper oil pressure is sensed by oil pressure switch 42, the engine is rotating at at least 1500 rotations per minute as sensed by vane 46 and switch 44 and the throttle is depressed thereby closing switch 50. If any one of these conditions is not met, the electrical circuit to the motor 36 will not be completed and the pump 28 will not pump water to the nozzle 18.

Located between the throttle switch 50 and the motor 36 is a variable resistance element such as a rheostat 54. The voltage to the motor 36 is adjusted by moving the wiper arm 56 of the rheostat 54. This arrangement allows a universal electric motor 36 to be utilized with various different size diesel engines having various different requirements. After the water injection system 10 of the present invention is installed, rheostat 54 is then adjusted so that the motor 36 drives pump 28 at the proper speed for pumping the optimal amount of water into the air intake pipe 16.

The electrical control system is also provided with an indicator lamp 58 connected between the hot side of the motor and ground. It should be readily apparent that lamp 58 lights only when electrical power is supplied to the motor 36 and therefore indicates when the system is operative. Preferably lamp 58 is located in a position to be visible by the driver. Lamp 58 also functions to indicate when the reservoir 20 is empty and needs refilling. As should be apparent to those skilled in the art, when there is water in the system which must be pumped by pump 28, a reverse torque is applied to the output of motor 36 which causes a slight drain on the electrical system thereby preventing lamp 58 from lighting to its fullest capacity. However, when reservoir 20 is empty, pump 28 runs freely thereby decreasing the torque on motor 36. As a result, more current is available to pass through lamp 58 and its brightness significantly increases. This is an indication to the driver that tank 20 is empty and needs refilling.

The present invention may be embodied in other specific forms without departing from the spirit or essential attributes thereof and, accordingly, reference should be made to the appended claims rather than to the foregoing specification as indicating the scope of the invention.

I claim:

1. A water injection system in a diesel internal combustion engine including an air intake manifold comprising:

a reservoir for holding a supply of water;

an electric pump means and means connecting the same to said reservoir for providing pressurized water from said reservoir;

electric circuit means for providing electric power to said pump means; a light means in series with said pump means for indicating when said reservoir is empty;

means within said circuit means for manually adjusting the amount of power provided to said pump means to thereby adjust the pumping capacity thereof;

nozzle means located in said manifold and means connecting the output of said pump means to said nozzle means, and switch means within said circuit means, said switch means being responsive to at least one predetermined proper operating condition of said engine for starting said pump means to thereby pump water to said manifold.

2. A water injection system as claimed in claim 1 wherein said switch means includes an oil pressure switch.

3. A water injection system as claimed in claim 1 wherein said switch means includes a throttle switch.

4. A water injection system as claimed in claim 1 wherein said switch means is responsive to engine speed.

5. A water injection system as claimed in claim 4 wherein said switch means responsive to engine speed is comprised of an air vane operated switch located adjacent the engine cooling fan.

6. A water injection system as claimed in claim 1 wherein said switch means is comprised of a plurality of series connected switches, each being responsive to a different engine operating condition, whereby said pump is started only when each of said different operating conditions are satisfied.

7. A water injection system as claimed in claim 1 wherein said adjusting means includes variable resistance means.

* * * * *